United States Patent [19]

Wright et al.

[11] 3,919,719

[45] Nov. 11, 1975

[54] SURFACE LUBRICATION OF MAGNETIC MEDIA

[75] Inventors: Charles Donald Wright, Hanover Park; Kurt Gutfreund, Park Forest; John Brzuskiewicz, Dolton, all of Ill.

[73] Assignee: IIT Research Institute, Chicago, Ill.

[22] Filed: Apr. 4, 1974

[21] Appl. No.: 458,051

[52] U.S. Cl. ............... 360/134; 117/68; 117/161 P; 117/237

[51] Int. Cl.$^2$.... G11B 5/72; G11B 5/78; G11B 5/84

[58] Field of Search ......... 360/134, 131; 117/161 P, 117/161 ZB, 76 F, 68, 235, 237, 239

[56] References Cited

UNITED STATES PATENTS

| | | | |
|---|---|---|---|
| 2,923,642 | 2/1960 | Hausen | 360/134 |
| 3,149,996 | 9/1964 | Wagner et al. | 360/131 |
| 3,479,409 | 11/1968 | Hall | 360/134 |
| 3,617,378 | 11/1971 | Beck | 117/68 |
| 3,630,910 | 12/1971 | Akashi et al. | 117/235 |
| 3,704,152 | 11/1972 | Hartman et al. | 117/235 |
| 3,783,023 | 1/1974 | Hungerford | 117/235 |
| 3,821,025 | 6/1974 | Akashi et al. | 117/161 P |

*Primary Examiner*—Alfred H. Eddleman
*Attorney, Agent, or Firm*—Hill, Gross, Simpson, Van Santen, Steadman, Chiara & Simpson

[57] ABSTRACT

A magnetic transducing system where a liquid-state lubricating film forms a surface layer of the record medium and the thickness of the film (which is susceptible to shear forces due to pressure contact with the transducer head) is selected to be within a critical thickness range correlated with system parameters so as to essentially minimize both wear on the transducer head and transfer of liquid to the record contact face of the head.

The process of forming the liquid-state lubricating film is selected to avoid any disturbance of the molecular structure of the magnetizable layer of the record medium; and in particular the binder (preferably a cross linked polymer formulation without any constituents added for lubricating purposes) has the liquid-state lubricating film applied thereto without the assistance of swelling agents or other process steps which might be injurious to the integrity of the magnetizable layer.

10 Claims, 7 Drawing Figures

SURFACE LUBRICATION OF MAGNETIC MEDIA

The invention described herein was made in the performance of work under NASA Contract Number NAS 5-21623 and is subject to the provisions of Section 305 of the National Aeronautics and Space Act of 1958, Public Law 85-568 (72 Stat. 435; 42 U.S.C. 2457).

CROSS-REFERENCE TO RELATED APPLICATIONS

Applicants have discovered certain uniquely advantageous record media surface treatment formulations which are especially advantageous for use in the system herein disclosed, and reference is made to our copending application entitled "Perfluorinated Polyether Coatings On Magnetic Record Media" filed of even data herewith, U.S. Ser. No. 458,052, the disclosure of said copending application being incorporated herein by reference.

BACKGROUND OF THE INVENTION

All magnetic tapes require some form of lubrication in order to reduce the coefficient of friction generated with tape motion relative to a fixed magnetic recording head, for example. Heretofore, lubricants such as those known as silicones or various forms of stearic acid and others well known in the trade have been added to the ingredients used to form a magnetic coating on a substrate.

The lubrication thus becomes part of the magnetic coating. These lubricants have been identified as a major source of problems in study programs undertaken by the assignee of the present invention. The lubricants are a major contributor to binder weakness; i.e., they inhibit the oxide from being properly bound to the substrate. Further, since they do contribute to this problem in such a large factor, only small quantities of such lubricant can be added before severe degradation is noticed. Because of this small quantity of lubricant used, the lubrication effects in reducing coefficient of friction are consequently lessened.

The present disclosure has grown out of work with a goal of preparing a binder/oxide formulation far superior to present formulations for use in long-life satellite tape recording systems. The approach taken was to eliminate all oxide/binder weakening ingredients to determine how tenacious a bond could be developed irrespective of the actual usability of the tape. During the evaulation phase of these binders it was thought remotely possible (at the time) that the application of surface lubricants might be feasible following the initial coating process, without affecting the tenacity of the various binder systems. A further problem was thought to be that any surface application would cause an increase in head to tape separation causing a loss of output. Initial trials were made using various fluorinated hydrocarbons dispersed in solvents which did not affect the binders. The results initially were discouraging because of the inability to get proper dispersion of the lubricants in the solvents and inability to promote uniform drying across the tape. An initial buildup of lubricants was noticed at the head which would surely be intolerable for high frequency transducing operations. Efforts continued to solve this initial problem and a task order was received to determine if it would be possible to coat commercially made video tapes with fluorinated hydrocarbon in an attemtp to solve two failures of video tape on test flights of satellite recorder systems.

Various lubricants were tried and best success was found by avoiding certain apparent teachings and suggestions of the prior art.

In one apparently hypothetical prior art proposal, it was suggested that a fluorocarbon compound be included as a surface layer of the magnetic coating; however the actual teachings of this prior art reference suggested the application of the fluorocarbon film by spraying techniques, and while the reference stated that the film should be of the minimum possible thickness required to give a uniform surface of low coefficient of friction, it was stated that typically a thickness of about fifty microinches was practical for tapes used in computers. The experience of the applicants would indicate that this type of teaching would lead to unsuccessful results, and having apparently been presented as an after-thought alternative to incorporation of the fluorocarbon lubricant in the tape coating, should be considered as a failure to enrich the art.

In another example of the prior art, it is proposed that a lubricant mixture be applied to the magnetic member which may be pure lubricant but preferably includes a volatile carrier for the lubricant. It is stated that it is desirable to add a swelling agent to the lubricant mixture. This agent is stated to cause the binder to swell, thus enlarging its pores and increasing the degree of penetration of the lubricant and carrier into the oxide coating. In this prior art disclosure, it is stated that some fluorinated compounds, such as the polymers of tri fluorovinyl chloride are satisfactory, but it is further stated that a dispersion or emulsion of a finely divided solid lubricant also is suitable and is highly advantageous in applications such as "slant-track" video recording. The specific teaching of this prior art disclosure is to distribute lubricating material in a carrier liquid to form a lubricating liquid, applying the lubricating liquid to the surface of the coating, compressively rolling the record member while its coated surface is wet with the lubricating liquid, and then evaporating the carrier liquid to leave the lubricating material in the coating as a residue. The temperature to which one roller is heated is at least one 100° F. and the pressure between the rollers is between 200 and 10,000 pounds per linear inch. The teaching is that preferably the pressure is from 1,000 to 1,500 pounds per linear inch and the temperature is about 215° F. The hydraulic lubricating action was believed to comprise injection of the lubricating liquid into the pores or openings in the coating by subjecting the liquid to substantial hydraulic pressures. Although this disclosure contends that the lubricant does not interfere with the anchorage of the resin binder of the plastic tape, it is considered that disturbance of the molecular structure of the binder layer may result from the following of the preferred teachings of this disclosure, reducing the useful life of the tape; even more importantly, it is considered that an adequate lubricating layer does not result from the concept of injection into the magnetizable layer.

So far as is presently known, these prior art teachings are not being followed commercially, and it is concluded that these prior art teachings taken as a whole have failed to place in the hands of workers in the art the ability to achieve the strikingly improved and truly remarkable results which form from the subject matter of the present disclosure.

SUMMARY OF THE INVENTION

This invention relates to a magnetic transducer system employing a magnetic record medium having a special surface treatment so as to optimize the useful life of the system.

It is an object of the present invention to provide a magnetic transducer system wherein a liquid-state surface layer is adhered to the magnetizable surface of the record medium and is within a critical thickness range exceeding the minimum thickness wherein the transducer head contact face is not adequately protected under operating pressure contact conditions for the useful life of the system, and less than a maximum limit thickness where the liquid transfers to the transducer head or other contacting surfaces under the actual pressure contact conditions of operation of the transducer system.

In applying the liquid-state surface film to the magnetizable record medium, care is taken to avoid impairment of the molecular structure of the magnetizable layer, for example by avoiding extreme hydraulic pressure and/or swelling or other treatment agents, and instead the liquid layer is applied under conditions where the surface-treatment liquid will fully occupy the wettable surface area of the magnetizable layer essentially by surface tension forces and yet produce a permanently integral liquid-state overlayer for the record medium over the useful life of the transducer system.

The thickness of the liquid-state overlayer for the record medium is correlated with the wettable surface area of the magnetizable layer and the head-record medium contact pressure and avoids a thickness which even though not great enough to interfere with maximum resolution of the transducer head would yet result in transfer of liquid to the inactive surface of the record medium (for tape configurations, for example) or the contacting surfaces of the head and/or transport apparatus during the useful life of the system.

Because of the remarkable reduction in head wear, high transducing speeds and adequate head-record medium contact pressures are feasible using high permeability magnetic materials for the head and thus greatly improving signal to noise ratio without unacceptably impairing the useful life of the system (by the need for head replacement or other major maintenance interfering with the continuous availability of the transducer system for its intended purpose).

Particular features of the invention relate to magnetic tape configurations having the liquid-state surface film essentially occupying only the actual wettable surface area of the magnetizable layer without substantial penetration below the region of the actual wettable surface area (so as to avoid impairment of the molecular structure of the magnetizable layer) and yet providing an essentially permanent multimolecular thickness layer covering essentially all high points of the magnetizable layer surface without being mechanically wipable from the record tape during pressure contact with the transducer head over the useful life of the system. (The concept of useful life of the system implies that the liquid-state film of the present invention will critically improve the potential weakest element of the system so that the overall useful life of the system is vastly improved in comparison to the prior art, especially considering such life as extending up to the point of a first major interruption of the useful life for repair, maintenance or the like.)

As an example of the application of the present invention, experience is cited with an endless loop cartridge transducer system for transducing broadcast television signals. Initial efforts to apply a liquid-state film in accordance with the present invention completely prevented operation of the system because of friction between adjacent convolutions of the coil of record tape. It was found, however, by greatly reducing the thickness of the liquid-state film that an optimum system could be achieved, and feasible tests to date indicate that it will possible to operate the endless loop record tape at speeds as high as 300 inches per second using high permeability metal heads and achieving a remarkable overall improvement in useful system life prior to head replacement or other major interruptions in system operation.

Other objects, features, and advantages of the present invention will become apparent with the teaching of the principles of the invention in connection with the disclosure of the preferred embodiments thereof (intended as exemplary rather than limiting), as shown in the drawings and described in the specification and claims.

DETAILED DESCRIPTION OF A PREFERRED EMBODIMENT

Figures 1, 2, 3, 4, 5, 6, 7:
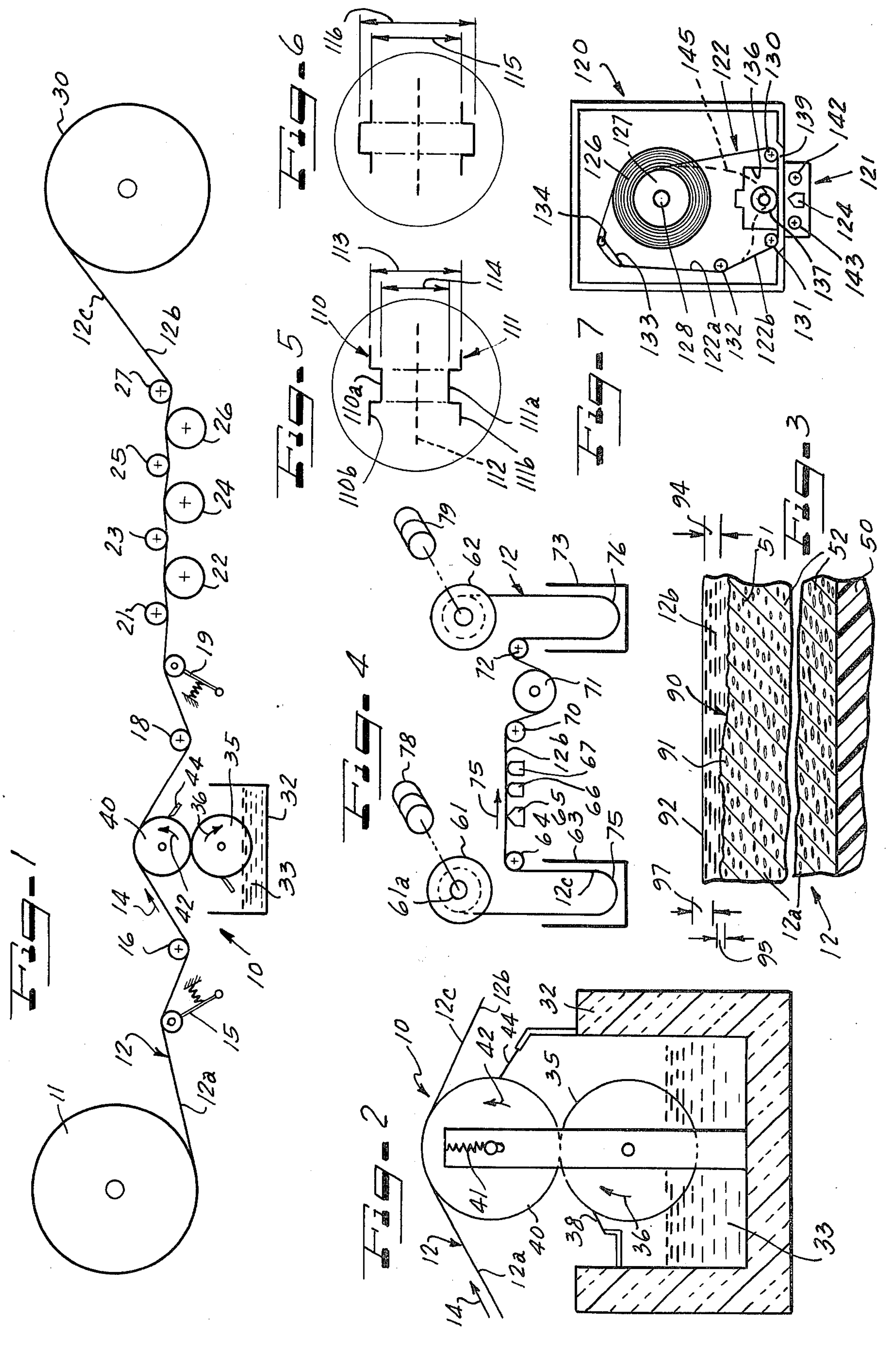
FIG. 1 is a diagrammatic illustration of a surface treating apparatus for applying a liquid-state film to the active side of a previously manufactured magnetizable record medium.
FIG. 2 is a somewhat enlarged diagrammatic illustration of the apparatus for applying liquid to the magnetizable surface of the record medium so as to more clearly indicate the manner of operation of the apparatus of FIG. 1.
FIG. 3 is an enlarged fragmentary diagrammatic view illustrating a magnetizable record medium with a liquid-state surface film in accordance with the present invention, and useful for explaining certain of the concepts of the present invention.
FIG. 4 is a diagrammatic illustration of a conventional magnetic transducer system to which the concepts of the present invention have been applied.
FIGS. 5 and 6 are diagrammatic views showing wave forms which are observed during the measurement of dynamic coefficient of friction, such measurements being useful in explaining certain of the remarkable results of the present invention.
FIG. 7 is a diagrammatic illustration of an endless loop cartridge color television video transducing system to which the teachings of the present invention had been applied with startlingly effective results.

Referring to FIG. 1 there is illustrated a preferred surface treatment apparatus 10 for practicing the teachings of the present invention. In this illustrated embodiment, a supply reel is indicated at 11 containing a supply of completely manufactured magnetic record tape 12 having a magnetizable layer defining an active side **12*a* of the tape. The tape 12 is illustrated as moving in the direction of arrow 14 successively over a tension arm of 15, a tape guide 16, the surface treatment apparatus 10, a tape guide 18, a further tension arm 19, and a succession of guides and treatment stations indicated 21–27, whereupon the tape with a liquid state surface layer 12*b* is wound on a take-up reel 30**.

As shown in greater detail in FIG. 2, surface treatment apparatus 10 may comprise a heated pan 32 containing a liquid state lubricant 33 which is to be applied as an over layer of the magnetizable layer 12*a* so as to provide a finished tape with a liquid state lubricating film as indicated at 12*b* in FIG. 1. The lubricant 33 is picked out of a fountain provided by pan 32 by means of a lower roller 35 which may be driven in the direction of arrow 36. The lubricant may be heated or cooled to a desired temperature to achieve the desired viscosity necessary for proper application by cooling or heating coils mounted within the base of pan 32. The surface finish of the lower roller 35 may be very smooth or treated by sand blasting or chemical etching to achieve the desired quantity of lubricant to be removed from the fountain. An instrumented variable loading doctor blade 38 may be lowered to the surface of the lower roller 35 to remove excess lubricant picked up by the lower roller from the fountain. The lubricant then is passed by the lower roller to an upper roller 40 at a line contact between the lower roller and the upper roller. The line contact loading may be adjustable by two variable loading helic springs such as that indicated at 41 loading the top roller 40 onto the bottom roller 35. Suitable alternatives for this loading force include pneumatic or hydraulic loading cylinders common to the trade. An instrumented variable loading doctor blade is also indicated in FIG. 2 at 44 operable for controlling the quantity of liquid supplied to the tape 12 by the upper roller 40. The upper roller 40 may be heated to a temperature of 125° to 150°F. to modify the viscosity of the selected lubricant and to promote volatility of solvent if present upon application to the tape 12.

The upper roller surface should have an extremely smooth surface finish to insure thin layer transfer of lubricant to the tape 12. Tape from the supply reel 11 may be guided to the top surface of the upper roller 40 and wrapped in an arc of approximately 30° to 90° over the upper roller. Precision tension supply and take-up tension servo systems may be utilized in conjunction with tension arms 15 and 19 to correctly tension the web as it passes over the top roller 40. The preferred direction of the top roller is in the opposite direction to the tape motion and this is indicated by arrow 42; however, either direction may be utilized depending on tape adsorption of the lubricant from the top roller 40. The speed of the tape 12 passing over the top roller 40 may be from several inches per second to several hundreds of feet per minute. Speeds of take-up and supply of the media should be adjusted in relation to the circumferential speed of the top roller 40, to allow a visual observation of the coating which initially has a wet or glossy appearance and changes to a transparent condition so as to give a color appearance corresponding to the visual appearance of the magnetizable surface 12*a* prior to the surface treatment step. The change to the transparent condition of the over layer produced by lubricant 33 generally occurs at a distance of from several inches to several feet following the contact of the tape 12 with the upper roller 40. The circumferential speed of the top roller 40 may be servo controlled to apply the correct thickness of the over layer of lubricant 33 as a function of the parameters of the transducer system with which the record medium is to be employed, as will hereinafter be explained. For the presently preferred actual wettable surface area of the magnetizable layer 12*a* and relevant transducer system parameters, it is found preferable to have the lubricating film 12*b* so thin as to be extremely difficult to monitor by on-line methods such as resistivity change, capacitive change, optical surface roughness change and the like.

Following application of the surface lubricant film, the lubricant remaining on the surface of the media may be heated to an elevated temperature (determined by the binder constituents) to promote removal of any low molecular weight constituents which may remain. The surface may also be buffed using industrial clean grade natural filament buffing material similar to a paint roller or the like. This buffing treatment can promote dispersion of the applied lubricant to cover the surface asperities frequently found in magnetic media. Such buffer treatment and/or heating may be applied to the tape at stations such as indicated at 22, 24 and 26. The direction of rotation of the buffers is preferably in the direction opposite to the web motion. The speed and quantity of the buffering stations is found to be a function of the surface conditions of the coated media. In some conditions it has been found not to be necessary for those media having an extremely smooth magnetizable surface 12*a* prior to application of the lubricant.

The surface treated web having the over layer 12*b* is then wound onto a take-up core or reel 30, guided if necessary by methods common to the trade.

A certain amount of testing may be required to insure compliance of finished surface coated media with previously manufactured uncoated media. If applied incorrectly, surface coating leads to undesirable effects. These include an increase of static and dynamic coefficients of friction; a decrease in recorded signal output which is especially noted at short wavelengths; a transfer of excess lubricants to the back-side 12*c* of the tape (impairing guidance by crowned guides); a significant increase in oxide resistivity; and a build-up of lubricant upon transducer heads (resulting in head-clogging in video heads). The cause of most of these problems has been found to be an excess quantity of surface lubricant. Thus it is essential that an adequate test program be maintained to assure a minimum impact on desired media characteristics while imparting the optimum life enhancing properties to the surface coated media.

By maintaining a substantially uniform thickness of over layer 12*b* within a critical thickness range, it is found that the life of the magnetic media and the magnetic transducer head or heads may be increased by several orders of magnitude to levels heretofore not realized, while at the same time the lubricating film forms a permanently integral and unitary part of the record element in spite of repeated transducing operations at the operating contact pressure value and at the transducing speed, and essentially without any transfer of the liquid of the over layer 12*b* to the record contact face of the transducer head during unlimitedly repeated transducing operations.

The process of forming the liquid-state lubricating film 12*b* is selected to avoid any disturbance of the molecular structure of the magnetizable layer 12*a* of the record media, and in particular the binder of the magnetizable layer 12*a* (which is preferably a highly cross linked polymer formulation without any constituents added for lubricating purposes) has the liquid-state lubricating film 12*b* applied thereto without the assistance of swelling agents or other process steps which might be injurious to the integrity of the magnetizable layer 12*a*.

Incorporation of lubricating compounds within the bulk of the magnetizable layer 12*a* has an advantage in that it affords a means of replenishing the friction-reducing agent at the tape surface, exposing new layers of lubricant as the coating wears; however internal lubricants, having a chemical incompatability with most binders, also have undesirable effects on the structural integrity of the magnetic pigment/binder system by impairing interfacial bond conditions and interfering with the proper polymerization of the resin. The incorporation of lubricants has been identified as a major limit of tape life in extensive studies undertaken at the assignee of the present invention. Concentrations of lubricants within the magnetizable layer, while reducing the dynamic coefficient of friction, actually reduce tape life. It is postulated that since the lubricant migrates to the surface of the tape, it also migrates to the substrate, inhibiting proper binding of the oxide magnetizable layer 12*a* to the substrate. Since the addition of lubricants contributes to this problem in such a large degree, only small quantities of lubricants can be added before severe degradation is noticed. When only small quantities of lubricants are added, the consequent lubrication effects are necessarily reduced.

In a common prior art approach it is proposed to add finite sized solid lubricant particles to the surface of the magnetic medium, for example polytetrafluoroethylene particles having a size of from 0.05 to 0.5 microns. The incorporation of finite sized solid lubricant particles also causes separation of the magnetic medium from the magnetic transducer by at least a distance equal to the size of the particles. This causes a loss in recorded signal on the tape and a subsequent loss during reproduction. Thus at extremely short wavelengths (less than 50 micro inches) frequently encountered in demanding video, instrumentation or computer applications, it is obvious that the reproduced signal output will be severely reduced by incorporation of a surface coating of finite sized lubricant particles.

The process illustrated in FIGS. 1 and 2 avoids internal tape lubricants and finite-sized solid tape surface lubricants and instead provides for the deposition on a fully manufactured (cured) magnetic media of an inert liquid film 12*b*, containing no particles, of a compound that is characterized by good lubricating and thermal properties, inert with respect to the constituents of the magnetizable layer 12*a*, and having a low surface tension preferably a bulk surface tension less than 20 dynes/centimeter (at 26° C). Further the vapor pressure is preferably less than about $1 \times 10^{-2}$ millimeters of mercury. The deposited film 12*b* should be in a sufficient quantity to completely cover the actual wettable surface area of the magnetizable layer 11*a* and should have a thickness sufficient not only to completely fill-in pores but to provide a sufficient number of molecular layers over any high points of the magnetizable layer so as to interpose between such high points and the contact face of the transducer head an easily shearable or interaction-lessening layer of lubricating agent. As will be explained, for the case of a magnetizable layer such as 12*a* having an extremely large actual wettable contact area per unit of surface area, and for transducer systems providing a relatively low operating contact pressure between the transducer head and the active surface of the record medium, the coating layer 12*a* may be as thick as 30 micro inches, that is appreciably less than one micron, as an upper limit thickness which cannot be exceeded if the lubricating film 12*b* is to form a permanently integral and unitary the part of the record element in spite of repeated transducing operations at the operating contact pressure value and at the transducing speed, and essentially without any transfer of the liquid to the record contact face of the transducer head during unlimitedly repeated transducing operations. It may be noted that a coating substantially thicker than the aforementioned upper limit thickness does not necessarily adversely effect reproduce output at a wavelength of 50 micro inch wavelengths, apparently because of the dispersive nature of liquids when under compression at a magnetic transducer head.

For the case of highly polished magnetic tapes of optimum smoothness, and for relatively high operating pressure contact values between the head and record medium, the permissible upper limit thickness will be very small in comparison to 30 micro inches, and indeed in the typical preferred operation of the illustrated surface treatment apparatus, it is found extremely difficult to measure the transparent surface film 12*b* even with a scanning electron microscope. A present estimate of a typical thickness, based on the lack of measureable capacitance changes and the like, would be that the thickness of the surface layer 12*b* would be of the order of a few micro inches so as to be well within the critical thickness range as taught by the present disclosure.

FIG. 3 is intended to indicate a fragmentary longitudinal section of a record element such as tape 12 having a very thin liquid protective coating 12*b* applied by surface treatment apparatus such as indicated at 10 and having a thickness within a critical range of thickness values as taught herein. While the record element may take the form of a card, drum, disk, magnetic stripe on motion picture film and the like, typically a most exacting application will involve a tape record element such as indicated at 12 comprising a flexible base material 50 such as polyethylene terephthalate (Mylar) film which may have a thickness of one mil (one mil=0.001 inch) or 1.5 mils, although the thickness may have other values preferably between 0.5 and 2.5 mils. While the record element may have any desired width, for the example of a tape configuration, the width would be for example between 0.125 inch and 3.0 inches wide, while the length would usually be in thousands of feet. The magnetizable layer 12*a* may consist essentially of a dispersion of magnetic particles such as indicated diagrammatically at 51 such as gamma ferric oxide, $Fe_3O_4$, chromiumdioxide, nickel-cobalt doped $Fe_2O_3$ particles and the like in organic resin diagrammatically indicated at 52 that comprises the binding matrix for the magnetic material and permits application to the tape substrate 50.

As previously mentioned it is common in the manufacture of quality magnetic media products to incorporate lubricating compounds as additives in the tape coating which combine with the other ingredients such as binders, wetting agents, plasticizers, anti-fungicides, carbon and oxides to become the active constituents of the tape system. In accordance with the preferred teachings of the present disclosure, this, as well as the incorporation of finite sized solid lubricant particles in an overcoat to the record medium, is entirely avoided. Instead, the coating 12*b* of an inert liquid-state lubricant is employed with a low surface tension (preferably less than twenty dynes per centimeter), high molecular weight (for example from about 2,000 to 7,000), and excellent lubrication and wetting properties. While it is possible to properly apply the liquid coating 12*b* with the use of a suitable solvent, the preferred procedure avoids the use of solvents, and particularly avoids the use of swelling agents or other procedures which may be detrimental to the structural integrity of the magnetizable layer 12*a*.

Also for the purpose of diagrammatic illustration, FIG. 4 is intended to illustrate a typical instrumentation magnetic transducer system for transporting a magnetic tape 12 from a supply reel 61 to a take-up reel 62. FIG. 4 is intended to illustrate a vacuum column type of transport wherein the tape is threaded across a lefthand vacuum chamber 63, over a guide 64, across respective erase, write and read heads 65–67, and then over a guide roller 70, a capstan 71, a guide roller 72, and across a righthand vacuum chamber 73. (For purposes of the diagrammatic illustration, it is considered preferably to show the tape as moving from left to right as indicated by arrow 75.) When the transport circuits are energized, a vacuum blower (not shown) begins to exhaust air from the bottom of the two vacuum chambers 63 and 73, drawing the tape 12 down into them. At the same time, photoelectric sensing circuits (not shown) come into action to determine the level of the loops 75 and 76 within the chambers 63 and 73 as is well known in the art. Motor and brake assemblies are indicated at 78 and 79 in operative association with the supply and take-up reels 61 and 62, respectively, and these assemblies control the respective reel shafts to maintain the loops 75 and 76 within predetermined limits during operation of the capstan 71 in driving the tape at a transducing speed.

During a transducing operation such as writing on the record tape or reading recorded information therefrom, the transport mechanism such as illustrated in FIG. 4 produces the necessary relative movement between the transducer head and the record medium at a suitable transducing speed. Such transducing speeds may be in the range from 1⅞ inches per second to two hundred and forty inches per second, for example. For the case of transports which move the record medium in steps in response to individual command pulses or the like, known as incremental or stepper transports, the term "transducing speed" will simply refer to the average rate of movement necessary to place the transducer head into scanning relation to successive bits of information or the like. For the purposes of the present invention, it is not material whether there is relative movement between the record element and the transducer head during an actual writing or reading operation. It is considered significant, however, that the tape is in a pressure contact with the record contact face of the transducer head and typically exhibits a predetermined wrap angle relative to a convex record-engaging face, for example, a wrap angle of 15° in the approach to the transducing gap of the head, and a further wrap angle of 15° at the departure side of the scanning gap. In the transducer systems here under discussion, the transport apparatus such as indicated in FIG. 4 will include means for maintaining a predetermined operating contact pressure between the record medium and the transducer head. This is illustrated, for example, by a typical tape tension at the transducer head of eight ounces for one-half inch wide magnetic tape.

As will hereinafter be described, tapes in accordance with the present invention have been tested on numerous types of tape transports such as an RCA type TR 70 video machine, an Ampex FR 1600 recorder, a loop tester, a Sony type CV-1200 EIA J type video recorder (using one-half inch wide tape), a Video Research Corp. Tape Shuttle Machine, an Odetics Atmosphere Explorer Satellite Recorder and a simulated TR 70C video transport, so that the details of the transport mechanism per se are not material to the present disclosure.

In transports such as indicated in FIG. 4, there is, of course, a minimum ambient operating temperature below which the transport is not intended to operate. The magnetic record element may be stored on a supply reel such as indicated at 61, and again a minimum ambient storage temperature is implicit in such equipment. Such a supply reel 61 is provided with a drive aperture such as indicated at 61*a* for coupling of the record tape with the transport apparatus during a transducing operation. Further, if a transport such as indicated in FIG. 4 is operated continuously in the transducing mode, for example by shuttling the record tape 12 back and forth between the respective reels 61 and 62, so that continuous pressure contact is maintained between the record contact fact of the transducer head and the record element at the operation contact pressure value during continuous relative movement at the transducing speed, it is possible to specify that the record element at its surface will be subject to a maximum working temperature which will be achieved after indefinitely extended continuous operation at the normal ambient temperature in which the transport is to operate.

DISCUSSION OF THE CHARACTERISTICS OF PREFERRED LIQUID-STATE LUBRICATING FILMS

The selection of a liquid free of particles for forming the surface film 12*b*, FIG. 3, preferably includes a consideration of the surface energy of the bulk lubricant material such that a highly effective coverage of the actual wettable surface area of the magnetizable layer 12*a* is achieved. In FIG. 3, the surface 90 of magnetizable layer 12*a* is indicated on a greatly exaggerated scale so as to diagrammatically indicate the surface roughness thereof which contributes to the actual wettable surface area of the surface 90. A low surface tension of the liquid forming film 12*b*, preferably lower than the critical surface tension of the resin binder 52, is desirable inasmuch as such a liquid tends to spontaneously spread on the surface 90 of the magnetizable layer, wetting the microscopic asperities and depressions that are characteristic of typical tape topography. The presence of such microscopic asperities and depressions can be shown in surface microphotographs of the surface 90. Good wettability of the surface 90 by the liquid of film 12*b* ensures lubrication of those elements of the magnetic tape such as indicated at 91 which are otherwise likely to come into frictional contact with the transducer head contact face, and to facilitate entry of the liquid into microscopic tape depressions rapidly during the surface treatment process as illustrated in FIG. 1. It would not be desirable to remove excess liquid at the treatment stations such as 22–26 prior to such time as the liquid had fully occupied the total potential region of surface 90, since filling of such surface region subsequent to the treatment steps of stations 22–26 would imply a reduction in the uniformity of the external surface 92 of film 12*b*.

A convenient approach for assessing the wetting relationships of polymers is available in measurements of the critical surface tension in accordance with the procedure developed by Zisman. See, for example, Fox, H. W. and Zisman, W. A., Journal of Colloid Science, Volume 5, pages 515 et seq. (1950). This procedure delineates the wetting behavior of polymers and relates their surface energy to the limiting surface tension of a liquid that spontaneously spreads on their surface.

The critical surface tensions of polyvinyl chloride and polyhexamethylene adipamide (Nylon) are 39 and 46 dynes per centimeter respectively. Urethane polymers (polyurethane), which are often used as binders for commercial magnetic tape coatings, have a critical surface tension of 33 to 40 dynes per centimeter, depending on formulation additives. With this in mind, a much lower critical surface tension of the liquid-state film 12*b* when coated on typical magnetic media such as critical surface tensions in the range from 22 to 31 dynes per centimeter affords a method for discriminating between a coating 12*b* having a thickness in excess of the critical minimum thickness and an insufficiently thick film overlayer. A value of critical surface tension for the record element such as indicated in FIG. 3 of less than 30 dynes per centimeter will characterize those preferred tapes which have been adequately treated in accordance with the teachings of the present disclosure.

For the sake of the diagrammatic illustration of FIG. 3, it is assumed that the external surface 92 of the liquid of film 12*b* can be considered a flat plane, and that there is a certain thickness dimension of film 12*b* such as indicated at 94 which can be conceived as essentially overlying essentially all peaks or high points of the surface 90 of the magnetizable layer. Further, the surface layer 12*b* can be conceived as having a further thickness dimension as indicated at 95 which may be thought of as corresponding to the total range of surface variation of surface 90 when considered from the standpoint of the actual wettable surface area of surface 90 of the magnetizable layer 12*a*. For the sake of a diagrammatic illustration, it can be considered that the thickness dimension 95 of liquid layer 12*b* should not be considered as an effective lubricating layer from the standpoint of the present disclosure since such a liquid layer by itself would not afford a sufficient protection against head wear. Further, it is conceived that a liquid layer as represented by the thickness 95 would not provide the reduction in dynamic coefficient of friction which is characteristic of a liquid layer within the critical thickness range as contemplated by the present disclosure after for example 30,000 passes.

For the preferred liquid state substances for layer 12*b*, it is found that a bulk surface tension in the range from about 16 to 18 dynes per centimeter results in a critical surface tension when coated on typical magnetic media of 21 to 31 dynes per centimeter. Generally, a record element in accordance with the present disclosure will be characterized by such a relatively low critical surface tension and by the application of the coating layer 12*b* without the use of extremely high temperatures and of hydraulic pressures which might tend to disturb the molecular structure of the magnetizable layer or its adherence to the base 50. Thus, in the illustrated surface treatment apparatus of FIGS. 1 and 2, no pressure rollers are employed, and temperatures in the range from 125° to 150° fahrenheit are used simply to facilitate spreading of a viscous lubricant by lowering its viscosity. Preferred liquids for the layer 12*b* may exhibit a viscosity of from 30 to 40 centistrokes at about thirty-eight degrees centigrade. Pressures of between 200 and 10,000 pounds per linear inch have been applied for the purpose of injecting liquid into the surface of a record tape in the prior art, and it is considered that the application of high hydraulic pressures to the magnetizable layer involves the risk of detriment to the wearing life of the resultant record element and thus is avoided in the production of the preferred record elements of the present disclosure. Even more critical, however, is the concept of the present disclosure that a liquid lubricating substance which is merely injected into the magnetizable layer will not provide adequate protection against head wear, and that instead the lubricating layer should cover the high points of the magnetizable layer with an adequate thickness of liquid to insure remarkably enhanced system life.

Other properties of the surface coating liquid in accordance with the present disclosure include the following:

a. High degree of chemical inertness so as not to react with the wide variety of binder systems presently in use in the manufacture of magnetic media.
b. High termal and oxidative stability to permit usage in a wide variety of media applications where thermal extremes would preclude usage of ordinary lubricants.
c. Non-flammable to allow its usage in magnetic media required to be self-extinguishing when exposed to fire.
d. Inertness with metals, glasses, ferrites and plastics at temperatures below 100°C to ensure no damage to magnetic transducers or guides, vacuum columns, capstans, etc.
e. Wide range or viscosities as a function of temperature to facilitate application in commercial processes.
f. Non-deposit forming to prevent build-up on magnetic transducers, guides, vacuum columns, capstans, etc.

Among synthetic lubricants which satisfy some of the aforementioned conditions (a)–(f) are dibasic acid esters such as di(2-ethylhexyl sebacate), di($C_8$oxo) azaleate and di(3,5,5,trimethylhexyl adipate), as well as alkyl- and aryl-polysiloxanes (silicone oils), such as dimethyl siloxames (SF-96, General Electric Company), phenyl-methyl siloxanes (DC-510, Dow-Corning Company) and halophenyl siloxanes (F-50, General Electric Company) and fluorinated diesters such as 1,6 hexanediol bis (Φ'-octanoate), bis (Φbutyl) sebacate and bis (Ψ'-amyl) adipate, as well as fluoropolyethers. The fluorocarbon compounds and their derivatives are particulary attractive in tape lubricating applications because of their low friction, low surface tension and good thermal properties in addition to chemical inertness, which minimizes the danger of modification (weakening) of mechanical properties of the magnetic coating.

A preferred compound for the treatment of magnetic media which satisfies all of the above mentioned conditions is a perfluoroalkyl polyether having the general formula $$F\text{-}[CF(CF_3)CF_2O]_nC_2F_5$$

such as the Krytox family of oils (Krytox types 143AZ, 143AA, 143AY, 143AB, 143AX, 143AC and 143AD) manufactured by the E. I. DuPont de Nemours and Company (Inc.), Petroleum Chemicals Division. These oils are characterized by a molecular weight from about 2000 to 7000, a viscosity of 18 to 495 centistokes at 100°F, a surface tension of 16 to 19 dynes/cm and a vapor pressure of less than $1 \times 10^{-2}$ mm Hg at 25°C. The Krytox oils are also characterized by a high degree of chemical inertness, high thermal and oxidative stability, non-flammability, and non-deposit forming properties.

DISCUSSION OF THE METHOD OF APPLICATION OF THE LIQUID LAYER IN ACCORDANCE WITH THE TEACHINGS OF THE PRESENT DISCLOSURE:

The surface lubricant may be used without dilution or dispersed in a suitable solvent such as trichlorotrifluoroethane (Freon TF). The application of this and other liquid lubricants may be accomplished by conventional methods of knife, spray roller coating, or by deposition. It is extremely critical, however, that the amount applied to carefully controlled to insure that the thickness be within the critical thickness range as contemplated by the present disclosure. The thickness of the layer is preferably sufficiently thin so that it cannot be accurately monitored by observations of resistivity change, capacitive change, optical surface roughness change or the like. Thus, off-line measurements are presently employed such as the observation of critical surface tension changes and observation by scanning electron microscope. Measurement of coating thickness corresponding to the thickness layer 94 in FIG. 3 appears to be feasible by means of an ionic bombardment apparatus capable of observing when the products of bombardment indicate that high points of the magnetizable layer surface 90 have been reached. As explained in our aforementioned copending application, the surface roughness of a magnetic recording layer can vary over exceedingly wide ranges though particularly common ranges of surface roughness fall in the range of from about 1 to 100 microinches. When coated with a liquid-state lubricant film, a layer of magnetic recording material is covered with a layer (94, FIG. 3) which can range from as low as a few molecules in thickness up to a thickness which can be of the order of about three microinches. A convenient lower limit is about 100 angstroms though thinner and thicker coatings may be employed without departing from the spirit and scope of the invention. A coating of 100 angstroms refers to roughness peaks on the surface of a given layer of magnetic recording material. As also explained in our copending application, the thickness of the layer (94 FIG. 3) is typically in the range from as low as a monomolecular layer, and need by only molecularly thin to impart adequate lubricating properties to a tape and achieve the improved characteristics associated with a product tape of this invention.

Further as stated in our copending application, the product medium with the liquid-state lubricant film thereon displays substantially no tendency to deteriorate even after periods of prolonged storage and/or use. This result represents an improvement since certain prior art fluorinated materials heretofore applied to the surface of a magnetic recording medium produced a product medium which showed a tendency to deteriorate after a period of prolonged storage and/or use. It is theorized that such prior art material contained, in addition to fluorine substituents, chlorine substituents, and, further, that these chlorine substituents, with time, resulted in a tendency for the prior art material to degrade. This degradation then causes not only a surface lubricating layer change but also a deterioration in the underlying magnetic recording medium layer.

A typical application method consists of transporting the media either as a web or as a ribbon over a top roll such as indicated at 40, FIG. 2, of a reverse roll coater 10 to achieve contact over approximately 30°. Speeds of take-up and supply of the media should insure that the applied liquid has fully occupied and filled the available wettable surface area of surface 90 prior to treatment station such as 22, 24, 26 which may involve removal of excess liquid or similar treatment steps.

Extensive observations of coefficient of friction of media having a surface layer 12*b* within the critical thickness range have not yet been carried out; however, preliminary results indicate that it will be feasible to identify tapes with a lubricant layer above the minimum thickness value required by observation of the reduction of drag as between the uncoated tape and the tape produced by the apparatus of FIGS. 1 and 2, for example.

Preliminary test involved a reel of Minnesota Mining and Manufacturing Company type 900 tape. Unused tape of this type at first pass over the measurement apparatus was compared with a section of the same type of tape having the treatment in accordance with the present disclosure. It was found that the drag exhibited by the treated tape was 0.75 times the drag of the uncoated tape at first pass indicating a large differential for a treated tape having an adequate layer of the liquid film 12*b*. It is expected that liquid layers of inadequate thickness will provide intermediate values of drag (particularly after 30,000 passes in a loop tester) which will be apparent and which can be readily correlated with wear tests on the transducer head of interest. The foregoing drag tests were made in relation to a simulated transducer head where an aluminum substrate had a five mil thick chromium plating thereon, so that effectively only the chromium surface represented the record medium contact face of the transducer head. The wrap angle and tape tension values are explained in the following section which gives the details of later tests.

DISCUSSION OF COMPARATIVE MEASUREMENTS OF STATIC AND DYNAMIC COEFFICIENT OF FRICTION (FIGS. 5 AND 6)

FIGS. 5 and 6 illustrate oscilloscope displays which are obtained in the course of measurement of static and dynamic coefficients of friction as explained in this section. In this procedure, a Video Research Corporation reel to reel tape transport capable of forward, stop and reverse modes is used in conjunction with a head mounting system suitably instrumented to measure the drag force of the tape against the head with the oxide surface of the tape in contact with the operative face of the magnetic head. The magnetic head used effectively has a chrome record contact face as previously explained. The magnitude of tape wrap angles and tape tension are thirty degrees and eight ounces, respectively. The transport is alternately operated in a forward mode and a reverse mode at a speed of thirty inches per second while monitoring the output of the calibrated head drag transducer. Two values of drag are extracted from the measurement data, namely: peak to peak drag at the turn around point from which the static coefficient of friction is calculated, and the peak to peak drag while running, from which the dynamic coefficient of friction is calculated.

The frictional coefficients are derived from the following relationship:

$$\mu = \frac{1}{\Theta} \ln \left[\frac{D}{2To} + 1\right]$$

$\mu$ = frictional coefficient
$\theta$ = wrap angle in radians
D = peak to peak drag
To = initial tape tension
The Taylor's series for ln x has the formula:

$$\ln x = (x-1) - \frac{(x-1)^2}{2} + \frac{(x-1)^3}{3} + \frac{(-1)^n (x-1)^n}{n}$$

Therefore $$\ln \left[\frac{D}{2To} + 1\right] = \frac{D}{2To} - \frac{\left(\frac{D}{2To}\right)^2}{2} + \frac{\left(\frac{D}{2To}\right)^3}{3}$$

$$\approx \frac{D}{2To}; \text{ and } \qquad \mu = \frac{1}{\Theta} \quad \frac{D}{2To}$$

PROCEDURE I

A 200 foot virgin tape, Minnesota Mining and Manufacturing Company type 900, with the liquid coating of the present invention, and without such liquid coating, are threaded on the reel to reel transport separately. At first, the transport is operated in a forward mode with a speed of thirty inches per second, and tape tension of eight ounces, and tape wrap angle of thirty degrees total. The dynamic drag force in forward direction is recorded on a type 564B Tektronix storage oscilloscope. After a delay of three seconds, the transport is changed to reverse mode. At this time, the storage scope will record the peak to peak drag at the turn around point and reverse direction dynamic drag.

PROCEDURE II

A length of 54 inch tape, Minnesota Mining and Manufacturing Company type 900, with the liquid coating of the present invention, and without such a coating, is put on the loop machine to run 2000, 5000, 30,600 passes separately. The 54 inch tape is spliced into the 200 feet of virgin tape Minnesota Mining and Manufacturing Company type 900. Then the transport is operated in a forward direction and in a reverse direction separately. In one case, as illustrated in FIG. 5, the timing of the oscilloscope is such that the tape sections with the liquid coating is displayed during forward mode as indicated at 110, and then the timing is such that the same section of tape is displayed during reverse mode as indicated at 111. Thus, the portion of wave form at **110*a* represents the reduced drag of the surface treated tape section for one polarity of output of the calibrated head drag transducer, and the wave form portion 111*a*** indicates the same reduced drag of the surface treated tape section but with the opposite plurality of output from the drag transducer.

In particular, FIG. 5 illustrates the results where a 54 inch tape with a liquid coating in accordance with the present invention has been operated on a loop machine so as to make 5000 passes over the simulated transducer head contact face described herein. This 54 inch tape section after being subjected to 5000 passes, is spliced into the 200 foot virgin tape previously described, and the reel to reel tape transport is operated in the forward mode with timing to generate the wave form 110, FIG. 5, whereupon after a three second delay, the transport is reversed, and the storage scope triggered to display the wave form 111. Thus, the base line **110*b* represents the drag of the virgin tape in the forward mode, and the base line 111*b* represents the same drag of the virgin tape but of opposite polarity with reference to the zero line indicated at 112 on the oscilloscope face. Since the oscilloscope face is calibrated, for example twenty millivolts per division on a vertical scale, it is possible to obtain a peak to peak measurement as indicated at 113 for the virgin tape, and a corresponding peak to peak measurement as indicated at 114 for the surface treated tape section of the present invention after 5000 passes. The value of dimension 114 in millivolts represents the peak to peak drag D for the surface treated tape, while the dimension 113** in millivolts represents the peak to peak drag D for the virgin tape, without any surface treatment in accordance with the present invention.

Similarly, FIG. 6 represents the results where a 54 inch section of the type 900 tape is subjected to 5000 passes on the loop machine, the tape otherwise being in its original condition as purchased and thus essentially corresponding to the virgin tape except for the affects of the 5000 passes. This untreated 54 inch section is spliced into the 200 foot virgin tape the same as used for FIG. 5, and the same operation of the reel to reel transport is effected to obtain the corresponding peak to peak measurements 115 with respect to the virgin tape, and 116 with respect to the same type of tape without any treatment but having been subjected to 5000 passes under the same conditions as the surface treated tape section of the present invention as represented in FIG. 5. Accordingly, the values for D in millivolts for the virgin tape and for the untreated tape section after 5000 passes are obtained from FIG. 6. The dimension 113 in FIG. 5 will correspond to the dimension 115 in FIG. 6, since both represent the drag characteristics of the virgin tape. For the case of a 54 inch tape section, initially before being subjected to a series of passes on the loop machine, the dimension 116 would, of course, be equal to the dimension 115 since the two tapes would initially be in the same virgin condition.

Utilizing the apparatus as described and measurements such as indicated in FIGS. 5 and 6, the comparison of the static and dynamic coefficient of friction for untaped coated tape sections, and for tape sections coated in accordance with the present invention are tabulated as a function of numbers of passes on the loop tester in the following table:

TABLE I

Comparison of Static and Dynamic Coefficient of Friction With Tape Uncoated and Coated by Different Passes.

| No. of Passes | Zero Passes | 2000 Passes | 5000 Passes | 30,600 Passes |
|---|---|---|---|---|
| Static $\mu_s$ uncoated | 0.380 | 0.420 | 0.476 | 0.637 |
| Static $\mu_s$ coated | 0.280 | 0.276 | 0.324 | 0.328 |

-continued

| No. of Passes | Zero Passes | 2000 Passes | 5000 Passes | 30,600 Passes |
|---|---|---|---|---|
| Dynamic $_d$ uncoated | 0.322 | 0.374 | 0.420 | 0.441 |
| Dynamic $\mu_d$ coated | 0.240 | 0.260 | 0.240 | 0.274 |

If the uncoated tape sections have their values of coefficient of friction taken as 100 percent after the successive numbers passes on the loop tester, then the data of Table I, on the basis of a percentage comparison, would appear as follows:

TABLE II

Comparison of $\mu$ by Percentage

| No. of Passes | Zero Passes | 2000 Passes | 5000 Passes | 30,600 Passes |
|---|---|---|---|---|
| Static $\mu_s$ uncoated | 100% | 100% | 100% | 100% |
| Static $\mu_s$ coated | 73.6% | 65.7% | 66.6% | 51.6% |
| Dynamic $\mu_d$ uncoated | 100% | 100% | 100% | 100% |
| Dynamic $\mu_d$ coated | 75% | 69.5% | 57% | 62% |

Since it is presumed that the type 900, tape used for comparison purposes is provided with an optimum prior art lubricating means, it is considered that the results set forth in Tables I and II are truly remarkable and unexpected at this stage of the development of the art.

SUMMARY DISCUSSION ON SELECTION OF LIQUID COATING THICKNESS ACCORDING TO THE CONCEPTS OF THE PRESENT INVENTION

As a further potential off-line test for an adequate thickness of liquid layer 12*b*, as previously indicated, there is a substantial differential in critical surface tension between the value for the surface 90 of the untreated magnetizable layer, and the value for the properly treated record element such as indicated in FIG. 3. Thus, for example, if the critical surface tension for the magnetizable layer 12*a* is 35 dynes per centimeter, and the critical surface tension for the treated record element is 30 dynes per centimeter with a thickness of the liquid layer 12*b* above the minimum required thickness value, it is reasonable to expect that the measurement of critical surface tension for a given thickness of liquid layer can be correlated with head wear tests so as to enable the specification of the minimum layer thickness in terms of the change in critical surface tension. Further, if an optimum layer thickness for coating 12*b* is found to correspond to a critical tension of 25 dynes per centimeter, a differential of 10 dynes per centimeter would be involved between the uncoated record media and the record media with the optimum coating thickness, and any value of critical surface tension in off-line measurements more than 50% of the differential in excess of the optimum critical surface tension value would indicate an unacceptable section of record medium which would require recoating or rejection. Similarly, thicknesses of the liquid layer 12*b* in excess of a maximum layer thickness as contemplated by the present disclosure can best be determined in the first instance by running an extended length of coated record tape, say 9600 feet for 100 passes, over the record contact face of the head materials of interest and determining the thickness value at which liquid begins to transfer from layer 12*b* to such contact face. With liquid layer thicknesses within the critical range contemplated by the present disclosure, there will be essentially no observable build-up of the liquid on the record contact face of the transducer head in spite of extraordinarily large numbers of passes of such a length record tape over the transducer head. Experience to date has indicated that even with a magnetizable layer of an extremely large actual wettable surface area per unit of geometric surface area, a liquid layer as thick as 50 microinches would rapidly produce a buildup of liquid on the transducer head contact face, and accordingly it is concluded that such a large thickness value will always be in excess of the maximum limit thickness value as contemplated herein. Accordingly, as a general matter, it is concluded that a liquid-state layer 12*b* in accordance with the teachings of the present disclosure will always be substantially less than one micron, and based on present experience, it is concluded that a liquid layer according to the present invention would not have a thickness greater than about 25 microinches for the case of actual wettable surface areas of the commercial tapes referred to herein and for a typical operating contact pressure value such as that which would be found with specific apparatus described in reference to FIG. 4.

The minimum thickness of the liquid coating 12*b* is considered to depend on the roughness characteristics of the surface 90 of the magnetizable layer and particularly upon the operating contact pressure value between the head and record element. In any event, it is contemplated that the minimum thickness value for the liquid layer 12*b* will exceed the thickness indicated at 95 and previously discussed, and more particularly, the liquid will cover high points of the magnetizable layer with a multimolecular layer adequate to give the characteristic low coefficient of friction over extended numbers of passes discussed in the previous section of this specification. For the sake of a diagrammatic illustration, a critical thickness range for the illustrated embodiment has been indicated by the reference numeral 97 in FIG. 3. The actual thickness value indicated in FIG. 3 may be thought of as the sum of the unacceptable thickness value 95 and the further thickness value 94, and may be taken as the optimum thickness value corresponding to maximum life of the transducer system of interest such as that illustrated in FIG. 4. Preferably, the optimum thickness value is determined, and correlated with comparative coefficient of friction measurements as explained in the preceding section, with critical surface tension measurements and with observations by means of ionic bombardment as previously mentioned.

Further, the preferred liquid layer 12*b* is produced essentially in the absence of substantial values of externally applied hydraulic pressure and/or swelling agents so that the liquid occupies essentially only the actual wettable surface area of the magnetizable layer without substantial penetration below the region of the actual wettable surface area, thus avoiding any substantial disruption of the molecular structure of the magnetizable layer.

ENDLESS LOOP CARTRIDGE (FIG. 7)

FIG. 7 illustrates a record element 120 in the form of an endless loop cartridge for coupling with a tape transport such as generally indicated at 121 for movement of a record tape 122 at a transducing speed past a stationary transducer head 124. In this embodiment, a coil 126 of the record tape is carried on a reel or turntable 127 which is rotatably mounted on a central axis indicated at 128. A portion of the tape extends along a coupling path exterior to coil 126 about respective shiftable guides 130 and 131, a fixed guide 132 and a tension arm 133 pivotable at 134. The cartridge is provided with a bottom aperture 136 for receiving a capstan drive assembly 137, and the front of the cartridge is provided with an aperture 139 for receiving the transducer head 124 and pressure rollers 142 and 143 which engage the tape with opposite sides of the capstan 137 during a transducing operation, the guides 130 and 131 being shiftable clear of the tape path so that the operating tape path follows the path indicated by dash line 145. Details of the capstan drive assembly and the cooperating pressure rollers are given in U.S. Pat. No. 3,725,608 assigned to the assignee of the present case. Further details are given in German published patent application P 23 31164.0–53 laid open for public inspection on Mar. 21, 1974.

By way of example, tape 122 may comprise one-fourth inch wide Minnesota Mining and Manufacturing Company type 971 which has a magnetizable layer with cobalt doped magnetic particles. The transducer head 124 may have a tape contact face of "Alfesil" iron-aluminum-silicon alloy which is normally subject to substantial wear in the configuration of FIG. 7 and with a tape tension at the transducer head during operation of from about one to four ounces (one-quarter inch tape). The normal transducing speed for this cartridge system is about 120 inches per second.

When a liquid layer of the preferred material herein but having a thickness greater than the maximum limit thickness as indicated by dimension 97 in FIG. 3 was employed in the cartridge configuration of FIG. 7, it was found that friction between the successive convolutions of tape in the coil 126 prevented pulling the tape from the inner side of the coil by means of the transport 121. This was true in spite of an optimum lubricant on the inactive side 122*a* of the record tape 122.

When, however, a liquid lubricant layer was applied to the active side 122*b* of the record tape 122 having a thickness within the critical range indicated at 97, successful operation of the system was obtained. By modifying the drive motor of the transport 121, it was possible to operate the motor at a speed corresponding to a transducing speed of 180 inches per second, and the cartridge 120 operated successfully at this speed also. It is considered feasible with a liquid surface treatment at the active side 122*b* within the critical range 97 to operate the cartridge 120 at transducing speeds of 240 inches per second and even at 300 inches per second.

In carrying out the cartridge embodiment, it is considered essential that the preferred liquid as taught herein be applied to the active side 122*b* of the tape without, however, any of the liquid being applied to the inactive side 122*a*. Further, in spite of the pressure contact and sliding friction between the successive turns of the coil 126, it is necessary that the liquid layer at the active side 122*b* not transfer to the inactive side 122*a*, so that the inactive surface of the record tape will remain essentially free of the liquid forming the active surface in spite of extended operation of the transport apparatus (for example, continuous operation at the transducing speed for six hours). The liquid layer at the active surface 122*b* is less than a critical value at which the interconvolution frictional forces in the coil 126 exceed the driving force of the transport apparatus 121 tending to pull the inner convolution of the coil along the coupling path indicated in this case by reference numeral 145.

Because of the remarkable wear-reducing qualities of the liquid layer at the active surface 122*b*, it is considered to be feasible to utilize high permeability metal cores for the transducer head 124, thus vastly increasing the available signal-to-noise ratio. With operation at a tape speed of 240 inches per second, it is considered feasible to transduce signal frequency up to five megahertz with a transducer system such as illustrated in FIG. 7.

EXAMPLES OF MAGNETIC RECORD ELEMENTS ACCORDING TO THE PRESENT INVENTION

The preferred compound for the treatment of magnetic records is a perfluoroalkylpolyether such as Krytox 143AA liquid (E. I. DuPont de Nemours & Co.) with a viscosity of 30 to 40 centistokes at about 38° centigrade, a bulk surface tension of 16 to 18 dynes per centimeters at twenty-six degrees centigrade, and a vapor pressure of less than $1 \times 10^{-2}$ millimeters of mercury at twenty-five degrees centigrade. In the preferred procedure, the lubricant is used without dilution by a solvent. After coating with the apparatus of FIGS. 1 and 2, excess lubricant is removed in a buffing process at work stations such as indicated at 22, in which a rotating cylinder, covered with a one inch-thick layer of sheepwool is used as the buffing medium.

The effectiveness of the perfluoroalkylpolyether liquid treatment thus used for reducing wear of magnetic tape and transducer heads was determined for magnetic coatings that were formulated with different binder resins and applied to Mylar polyester tape substrates in a gravure coating and calendering operation on commercial coating equipment. The formulas of the coatings used are given in the following examples.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification and drawings.

EXAMPLE 1

This Example illustrates the preparation of a two-component coating system for a magnetic recording medium.

COMPONENT NO. 1

About 240 grams of a polyamide resin characterized by being the condensation product of polymerized linoleic acid with polyamines, that is: $n$ HOOC—R—COOH + $n$ $H_2N$—R'—$NH_2$ → HO(—OC—R—CONH—R'—NH)$n$ H.R",R''' where $n$ varies with the different grades commercially available, by having an amine value of 210–230, a viscosity of 500–750 poise at 40°C utilizing a No. 6 Spindle at 4 RPM, and a Specific Gravity of 0.99, is dissolved in a solvent system comprised of about 2464 grams of xylene and 1173 isopropyl alcohol. In this polyamide, R and R′ are each a lower alkylene group containing from 2 through 7 carbons each and R″ and R‴ are each a lower alkyl group containing from 1 through 7 carbon atoms each. Such a material is available commercially under the trademark "Versamid 115" from the General Mills Co., Minneapolis, Minn.

Next, about 2800 grams of gamma $Fe_2O_3$ pigment particles, characterized by an equivalent spherical diameter of 0.2 microns and an aspect ratio of 4:1, (the pigment was obtained from Charles Pfizer Co. under the designation MO-2350), is dispersed with 36 grams of carbon particles of 425 A (Std. Deviation 250 A) size, obtained from Shawinigan Co.

About 14.2 grams of a surfactant, an alkyl phenoxy polyethoxy ethanol, available commercially from the Rohm and Haas Co., Philadelphia, Pa. under the trademark "Triton X-100", is added to facilitate dispersion of the pigment particles in the resin solution. The resulting mixture is then ball-milled for about 90 hours to produce a uniform dispersion of the gamma $Fe_2O_3$ and the carbon particles in the liquid resin solution.

COMPONENT NO. 2

Separately, about 960 grams of an epoxide resin characterized by being the reaction product of epichlorohydrin and bisphenol A. (The general structural formula may be represented by

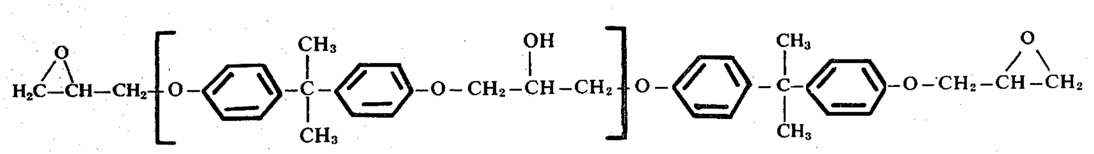

where $n>7$), the Epoxide Equivalent Weight is 3500–5500, and the softening point is 135°–155°C. The resin is dissolved in about 1124 grams of methyl ethyl ketone. This resin solution is mixed with the previously described dispersion (Component No. 1) just prior to a coating application operation upon a chosen substrate in a 1:1 weight ratio.

EXAMPLE 2

To a solvent system comprised of about 2275 grams of dimethyl formamide and about 745 grams of hylene is added a solution of a modified polyimide polymer. The modified polyimide polymer being a polyamide-imide. The modified polyimide resin solution comprises about 24–26 weight percent of such polymer dissolved in a solvent system comprised of about 66% dimethyl formamide and about 34% xylene. (This modified polyimide resinsolution is available commercially under the designation DE 910-101 from the de Beers Laboratories Incorporated of Braodview, Illinois. The ratio of such resin solution added to such reducing solvent system is about 161. To this reduced polymer solution is added about 2100 grams of gamma $Fe_2O_3$ characterized by an equivalent spherical diameter of 0.2 microns and an aspect ration of 4:1 (the pigment is obtained from Charles Pfizer Co., under the designation MO-2530), along with about 28 grams of carbon characterized by a particle size of 425 A (Std. Deviation 250 A), obtained from the Shawinigan Company. The reulting mixture is ball-milled for about 90 hours.

EXAMPLE 3

To a solvent system comprised of about 3100 grams of trichloroethylene, about 3100 grams of methanol, and about 620 grams of benzyl alcohol, is added about 800 grams of a polyamide resin available commercially from the Du Pont Company under the trademark "Elvamide 8063". This resin is characterized by being a copolymer of 6,6/6,10 (40/60), 6,6 being a polyamide derived from hexamethylene diamine and adipic acid, and 6,10 being a polyamide derived from hexamethylene diamine and sebacic acid. The raio of each polymer in the copolymer being about 40:60. The resin is further characterized by its solubility in methanol-chlorinated solvent by having a melting point of about 315°F, and having a specific gravity of about 1.08.

This polymer is dissolved in this solvent system by stirring at room temperature. To the resin solution is added about 1868 grams of gamma $Fe_2O_3$ characterized by an equivalent spherical diameter of 0.2 microns and an aspect ratio of 4:1, (the pigment is obtained from Charles Pfizer Co., under the designation MO-2530), and about 24 grams of carbon, characterized by a particle size of 425 A (Std. Deviation 250 A) obtained from the Shawinigan Company. The resulting mixture is ball-milled for about 90 hours.

In each of examples 1, 2 and 3, a magnetizable layer such as indicated at 12*a* was formed on the Mylar polyester web of six inch width with the magnetic particles oriented in the direction of tape movement. The tapes so formed were essentially free of any constituent added as a lubricant for the tape. The cured webs were separately passed through calendar rolls with two nips formed with a center stainless steel roll, having a chrome plated mirror finish, and top and bottom nylon rollers, with a pressure on the web at each nip of about 2000 pounds per lineal inch, the center roll being at a temperature of about 200°F.

The webs were then slitted to form magnetic record tapes of one-half inch width for treatment in the apparatus of FIGS. 1 and 2.

The liquid-state surface film such as 12*b* is applied to each of the tapes by the apparatus of FIGS. 1 and 2 with the Krytox 143 AA liquid essentially free of any solid state material and applied to the tapes under clean room conditions. No swelling agent is utilized in the application of the liquid-state film 12*b*, and the liquid is applied to the tape at a temperature in the range of 125° to 150° fahrenheit. The thickness of the liquid-state film 12*b* applied to the tapes is considered to be in the range of a few microinches, for example one to two microinches, since while the presence of film could be detected by a scanning electron microscope, it was not feasible to obtain a measurement of the thickness dimension by means of the optical or electrical techniques referred to herein.

The processing of the tapes included the buffing steps at stations such as indicated at 22, 24 and 26 in FIG. 1, but no substantial pressure was supplied to the liquid during the surface treating process, and no solvents were employed, the relatively low surface tension of the material and the relatively low speed of movement of the surface treatment apparatus being relied upon to cause the liquid to essentially occupy the actual wettable surface area of the magnetizable layer of the tapes.

THE PROCEDURE OF COATING LUBRICANTS

A modified reverse-roll coating apparatus has been developed as shown in FIG. 1. The web of any width of oxide coated tape is threaded as shown in FIG. 1. The supply reel has a holdback torque of 4 ounces which is generated by Electro Craft Motor Generator, Model E550-000. The tape then passes a 3 inch diameter rubber capstan which is not driven. Next, the web passes over the 3 inch diameter chrom overlay on brass applicator roll with 5$\mu$ inch finish. The applicator is driven at a reverse speed of 6 rpm which the motor is manufactured by American Electronics Motor, Model 3255M with a specification of 35v. d.c., 0.65 amp, 10 rpm, 10 inch - OZtorque. A stainless steel bottom applicator is mounted directly under the applicator. The bottom applicator roll is fine finished to 25$\mu$ inch. The lubricant is applied in a relatively thick layer to a very accurate smooth-surface roll applicator. The layer of lubricant carries around the bottom roll applicator is then metered by the upper applicator in the opposite direction. The bottom applicator is driven directly by the upper applicator. A pair of Kapton doctor blade is brought in contact against the rollers to remove all of excess lubricant. The force of blade on the top and bottom applicators are 5 ounce, 10 ounce, respectively. The temperature of lubricant should be kept at a constant temperature of 145°F. which is controlled by Visa-Thermometer (Electronic temperature Controller). After the lubricant coated tape passes through the applicator the tape go through pairs of guidance and buffers, alternately. The guide rollers which are made of aluminum are used to guide the tape over buffers and into the take up reel. The diameter of buffer is 2 inch with a 3 inch long No. 3V01 tru-Pro Super Mo-Vair Over a Phenolic Core. These Buffers are chain connected and driven by a Globe Inc. No. 162A395, 24 volts d.c. motor with a reverse speed of 120 rpm. Finally, the tape is taken up to the take up reel. The average take up reel speed is 7 ½ rpm which is generated by American Electronics Motor with specification of 35 volts d.c., 0.05 amp., 10 rpm, 10 ounce torque and corresponds to a tape speed of 12 feet per minute. The take up reel is a standard NAB hub with a diameter of 4 ⅛ inch. The tape conveyed speed should be kept at a constant speed of 12 feet per minute by continuous adjustment of the take up reel rpm.

DISCUSSION OF MEDIA TEST RESULTS

Media manufactured in accordance with the procedures described herein have been subjected to extensive testing to determine the effects of surface lubrication. In general the results of testing indicate the lubricated media displayed no measurable head wear or tape degradation after 200,000 passes.

| TAPE TYPE / TEST | TAPE No. 1 POLYAMIDE ON ETCHED MYLAR | TAPE No. 2 POLYAMIDE ON ETCHED MYLAR, COATED | TAPE No. 3 POLYAMIDE ON BASF MYLAR |
|---|---|---|---|
| OXIDE RESISTANCE (MΩ/SQUARE) | $85\times10^3$ | $120\times10^3$ | $85\times10^3$ |
| OXIDE THICKNESS (MILS) | 0.19 | | 0.24 |
| COERCIVITY Hc (OERSTED) | 315 | | 310 |
| RETENTIVITY (GAUSS) | 750 | | 760 |
| SQUARENESS RATIO Br/Bs | 0.83 | | 0.80 |
| FLEXIBILITY (DEGREE) | 41.6 | 42.3 | 45.7 |
| CUPPING (DEGREE) | 29.2 | 45.2 | 27.6 |
| THERMAL STABILITY | TOTAL ADHESION | TOTAL ADHESION | TOTAL ADHESION |
| ABRASION WEAR (AV. NO. OF PASSES) | 480 | 2090 | 250 |
| LOOP LIFE TEST | 200 K PASSES 40% OXIDE REMOVED | 200 K PASSES NO VISIBLE WEAR | 150 K PASSES 90% OXIDE REMOVED |
| DROPOUT (LOW DENSITY) | 1 | 5 | 6 |
| OXIDE THICKNESS VARIATION (%) | 4.1 | | 4.2 |
| D. C. HOISE (dB) | −35 | −35 | −37 |
| WAVE LENGTH RESPONSE TAPE SPEED=7.5 IPS (SIGNAL OUTPUT BELOW MAXIMUM) | OUTPUT λ/db | | |
| | 0.1 MIL −32 | −29.5 | −28.0 |
| | 0.5 MIL −6.0 | − *.* | − 3.9 |
| | 1.0 MIL −1.2 | − 1.9 | − 1.0 |
| | 5.0 MIL 0 | 0 | − 0.3 |
| | 10. MIL 0 | 0 | 0 |
| HEAD WEAR ($\mu$ in.) | 5 HEAD: No. 30, CHROME ON AL. 200 K PASSES | No MEASURABLE HEADWEAR HEAD: CHROME ON AL. 200 K PASSES | 5 HEAD: No. 40, CHROME ON AL. 150 K PASSES |

| TAPE TYPE / TEST | TAPE No. 4 POLYAMIDE ON BASF MYLAR COATED | TAPE No. 5 EPOXY ON ETCHED MYLAR | TAPE No. 6 EPOXY ON ETCHED MYLAR, COATED | TAPE NO. 7 HI TEMP POLYIMIDE ON KAPTON | TAPE No. 8 HI TEMP POLYIMIDE ON KAPTON, COATED |
|---|---|---|---|---|---|
| OXIDE RESISTANCE (MΩ/SQUARE) | $114 \times 10^3$ | $247 \times 10^3$ | $256 \times 10^3$ | 854 | $1.36 \times 10^3$ |
| OXIDE THICKNESS (MILS) | | 0.32 | | 0.11 | |
| COERCIVITY Mc (OERSTED) | | 310 | | 347 | |
| RETENTIVITY (GAUSS) | | 540 | | 1333 | |
| SQUARENESS RATIO Br/Bs | | 0.77 | | 0.69 | |
| FLEXIBILITY (DEGREE) | 40.3 | 34.8 | 28.7 | MEASUREMENT COULD NOT BE MADE BECAUSE OF CURL | MEAS. COULD NOT BE MADE BECAUSE OF CURL |
| CUPPING (DEGREE) | 43.4 | 20.1 | 22.6 | 30.6 | 47.3 |
| THERMAL STABILITY | TOTAL ADHESION | TOTAL ADHESION | TOTAL ADHESION | NO EFFECT | NO EFFECT |
| ABRASION WEAR (AV. NO. OF PASSES) | 8500 | 1280 | 40,000 | 6670 | 40,000 |
| LOOP LIFE TEST | 200 K PASSES NO VISIBLE WEAR | 200 K PASSES 30% OXIDE REMOVED | 200 K PASSES NO VISIBLE WEAR | 200 K PASSES SLIGHTLY WORN | 200 K PASSES NO VISIBLE WEAR |
| DROPOUT (LOW DENSITY) | 9 | 23 | 2 | 85 | 140 |
| OXIDE THICKNESS VARIATION (%) | | 3.5 | | 4.6 | |
| D. C. NOISE (dB) | −38 | −39 | −42 | −41 | −38 |
| WAVE LENGTH RESPONSE TAPE SPEED=7.5 IPS (SIGNAL OUTPUT BELOW MAXIMUM) | −25.0<br>−3.8<br>−0.7<br>−0.1<br>0 | −31.5<br>− 5.5<br>− 1.6<br>0<br>0 | −34.5<br>− 7.2<br>− 2.5<br>0<br>0 | −28.7<br>− 4.7<br>− 0.9<br>0<br>0 | −27.6<br>− 4.4<br>− 1.1<br>0<br>0 |
| HEAD WEAR (μ in) | NO MEASURABLE HEAD WEAR HEAD: CHROME ON AL. 200 K PASSES | 10 HEAD: No. 29, CHROME ON AL. 200 K PASSES | NO MEASURABLE HEAD WEAR HEAD: CHROME BRASS No. 7 200 K PASSES | 15 HEAD: No. 3, CHROME ON AL. 200 K PASSES | NO MEASURABLE HEAD WEAR HEAD: CHROME BRASS No. 40 200 K PASSES |

| TAPE TYPE / TEST | TAPE No. 9 LO TEMP POLYIMIDE ON ETCHED MYLAR | TAPE No. 10 LO TEMP POLYIMIDE ON ETCHED MYLAR, COATED | STANDARD TAPE 900 | STANDARD TAPE 900, COATED |
|---|---|---|---|---|
| OXIDE RESISTANCE (MΩ/SQUARE) | $5.1 \times 10^3$ | $5.0 \times 10^3$ | 90 | 220 |
| OXIDE THICKNESS (MILS) | 0.15 | | 0.2 | |
| COERCIVITY Mc (OERSTED) | 315 | | 300 | |
| RETENTIVITY (GAUSS) | 530 | | 470 | |
| SQUARENESS RATIO Br/BS | 0.83 | | 0.90 | |
| FLEXIBILITY (DEGREE) | 1.91 | 7.72 | 59.0 | |
| CUPPING (DEGREE) | 50.2 | 49.9 | 1.9 | |
| THERMAL STABILITY | NO EFFECT | NO EFFECT | NO EFFECT | |
| ABRASION WEAR (AV. NO. OF PASSES) | 3980 | 40,000 | 30 | 700 |
| LOOP LIFE TEST | 200 K PASSES SLIGHTLY WORN | 200 K PASSES NO VISIBLE WEAR | 222 K PASSES SLIGHTLY WORN | 222 K PASSES GOOD, NO VISIBLE WEAR |
| DROPOUT (LOW DENSITY) | 30 | 84 | | |
| OXIDE THICKNESS VARIATION (%) | 14 | | 2.5 | |
| D. C. NOISE (dB) | −37.5 | −37.5 | −41.5 | |
| WAVE LENGTH RESPONSE | | | | |

-continued

| TAPE TYPE<br>TEST | TAPE No. 9 LO TEMP POLYIMIDE ON ETCHED MYLAR | TAPE No. 10 LO TEMP POLYIMIDE ON ETCHED MYLAR, COATED | STANDARD TAPE 900 | STANDARD TAPE 900, COATED |
|---|---|---|---|---|
| TAPE SPEED=7.5 IPS | | | | |
| (SIGNAL OUTPUT | −26.0 | −24.4 | −22.4 | |
| BELOW MAXIMUM) | − 2.6 | − 2.4 | − 2.2 | |
| | − 0.5 | − 0.9 | − 0.4 | |
| | 0 | 0 | 0 | |
| | 0 | 0 | 0 | |
| HEAD WEAR | 5 | NO MEASURABLE | 180 | |
| μ in.) | HEAD: No. 3, CHROME | HEAD WEAR | HEAD: 4544 | |
| | 200 K PASSES | HEAD: NO. 13, CHROME | HONEYWELL | |
| | DECX 3 | ON AL. | LIVE HEAD | |
| | | 200 K PASSES | 200 K PASSES | |

We claim as our invention:

1. In a magnetic transducing system for operation at temperatures above a minimum ambient operating temperature, said system comprising a magnetic transducer head having a record contact face for continuous pressure contact with a magnetic record element during a transducing operation, a transport apparatus for producing relative movement between a magnetic record element and said magnetic transducer had at a transducing speed, said transport apparatus comprising means for maintaining pressure contact between said magnetic transducer head and a magnetic record element during a transducing operation substantially at an operating contact pressure value, a magnetic record element for storage at temperatures above a minimum ambient storage temperature and constructed for coupling with said transport apparatus during a transducing operation for the maintenance of the pressure contact of said record element with said transducer head substantially at said operating contact pressure value continuously during the relative movement thereof at said transducing speed, and said record element including a base and a magnetizable layer on said base defining an active side of the record element with said magnetizable layer having a surface with an actual wettable surface area available for wetting by a liquid substantially in excess of its geometric surface area, and a liquid forming an external liquid-state surface film at the active side of said magnetic record element and essentially occupying said actual wettable surface area of said magnetizable layer and having a thickness exceeding a minimum thickness sufficient for continuous liquid-state lubricating contact with said record contact face of said magnetic transducer head during a transducing operation, said liquid-state film being subject to a maximum working temperature after indefinitely extended continuous pressure contact with said record contact face at said operating contact pressure value during relative movement at said transducing speed.

said liquid-state surface film being comprised of a low vapor pressure substance having a melting point below the minimum ambient storage and operating temperatures of the magnetic record element and a boiling point above the maximum working temperature, and providing a liquid-state layer covering essentially all high points of the surface of said magnetizable layer and being essentially free of any solid state lubricating particles, and said liquid being adsorbed to said magnetizable layer of said record element as an effective lubricating overlayer of a maximum thickness of less than one micron, the maximum thickness of said lubricating overlayer being less than an upper limit thickness correlated directly with said actual wettable surface area of the magnetizable layer occupied by said liquid and correlated inversely with said operating contact pressure value such that said lubricating overlayer forms a permanently integral and unitary part of the record element in spite of repeated transducing operations at said operating contact pressure value and at said transducing speed, and essentially without any transfer of said liquid to said record contact face of said transducer head during unlimitedly repeated transducing operations.

2. A magnetic transducing system according to claim 1 with said record element comprising a magnetic record tape, said base being of an elongated tape configuration with a thickness not exceeding about two mils and providing an inactive surface of the record tape, the magnetizable layer of said record tape comprising a magnetizable powder and a resin matrix completely free of constituents incorporated therein as lubricants, and said liquid forming said external liquid-state surface film of the record tape essentially occupying only the actual wettable surface area of said magnetizable layer without substantial penetration below the region of said actual wettable surface area and providing a multimolecular thickness layer providing the external active surface of the record tape and covering essentially all high points of said surface of said magnetizable layer without being mechanically wipable from the record tape during pressure contact with the transducer head in the course of starting and stopping of transducing operations of said transport apparatus and during substantially unlimitedly continuous movement of the record tape relative to the transducer head at said transducing speed and with said means maintaining said contact pressure therebetween at an operating contact pressure value corresponding to a tape tension at the transducer head of from about one ounce to about ten ounces per one-half inch of tape width, and said transducer head being maintained stationary during a transducing operation and having a record contact face contacting substantially the entire width of the external active surface of said record tape.

3. A magnetic transducing system according to claim 2 with said record element comprising a reel on which the record tape is spirally wound with contact between the external active surface of one convolution of the record tape and the inactive surface of an adjacent convolution of the record tape, and the inactive surface of the record tape being essentially free of said liquid forming said active surface of said record tape in spite of coiling and uncoiling of the record tape on said reel during operation of said transport apparatus in repeated transducing operations.

4. A magnetic transducing system according to claim 2 with said magnetic record tape being in the form of an endless loop, said record element comprising a cartridge including a rotatable reel on which a coil of the record tape is wound, a portion of the record tape extending from the inner side of the coil along a coupling path external to the coil for coupling with said transport apparatus during a transducing operation and then extending to the outer side of the coil so that there is pressure contact and relative movement between the external active surface of one convolution of the coil of record tape and the inactive surface of an adjacent convolution of the record tape, the inactive surface of the record tape being essentially free of said liquid forming said active surface of said record tape in spite of extended operation of said transport apparatus, and the thickness of said liquid-state surface film being less than a critical value at which the interconvolution frictional forces in the coil exceed the driving force of the transport apparatus tending to pull the inner convolution of the coil along said coupling path.

5. In a magnetic transducing system according to claim 1, the magnetic record element being formed of flexible material and having its base comprising a synthetic resin backing and having its magnetizable layer comprising a resin binder with magnetic particles dispersed therein, the liquid-state surface film covering essentially all roughness peaks of the magnetizable layer with a layer having a thickness in the range from as low as a monomolecular layer up to a thickness of about three microinches.

6. A system according to claim 1 with the roughness peaks of the magnetizable layer being covered with a layer of the liquid-state surface film of about 100 angstroms.

7. In a magnetic transducing system according to claim 1, the magnetic record element having its base comprising a synthetic resin backing and having its magnetizable layer comprising a binder with magnetic particles dispersed therein, said binder including a polyamide resin which is a condensation product of polymerized linoleic acid with aliphatic polyamines containing 1 to 7 carbon atoms per molecule.

8. In a magnetic transducing system according to claim 1, the magnetic record element having its base comprising a synthetic resin backing and having its magnetizable layer comprising a binder with magnetic particles dispersed therein, said binder including an epoxy resin produced by the reaction of epichlorohydrin and bisphenol A.

9. In a magnetic transducing system according to claim 1, the magnetic record element having its base comprising a synthetic resin backing and having its magnetizable layer comprising a binder with magnetic particles dispersed therein, said binder including a polyamide-imide resin.

10. In a magnetic transducing system according to claim 1, the magnetic record element having its base comprising a synthetic resin backing and having its magnetizable layer comprising a binder with magnetic particles dispersed therein, said binder including a polyamide resin which is a condensation product of hexamethylene diamine and adipic or sebacic acids.

* * * * *